G. WATT.

3 Sheets—Sheet 1.

Plow.

No. 3,609.

Reissued Aug 17, 1869.

Witnesses.

Chas. D. Smith

J. E. M. Bonner

Inventor.

Geo. Watt

By Knight Bros

Attorneys

N. PETERS, Photo-Lithographer, Washington, D. C.

G. WATT.

3 Sheets—Sheet 2.

Plow.

No. 3,609.

Reissued Aug 17, 1869.

Witnesses:

Chas. D. Smith

J. E. M. Bowen

Inventor.

Geo. Watt

By Knight Bros

Attorneys.

N. PETERS, Photo-Lithographer, Washington, D. C.

G. WATT.

3 Sheets—Sheet 3.

Plow.

No. 3,609.

Reissued Aug 17, 1869.

Witnesses:
Chas. D. Smith
J. S. M. Bower

Inventor.
Geo. Watt
By Knight Bros
Attorneys

N. PETERS, Photo-Lithographer, Washington, D. C.

UNITED STATES PATENT OFFICE.

GEORGE WATT, OF RICHMOND, VIRGINIA.

IMPROVEMENT IN PLOWS.

Specification forming part of Letters Patent No. 71,560, dated November 26, 1867; Reissue No. 3,609, dated August 17, 1869.

*To all whom it may concern:*

Be it known that I, GEORGE WATT, of Richmond, Henrico county, State of Virginia, have invented a new and useful Improvement in Plows; and I do hereby declare that the following is a full, clear, and exact description thereof, which will enable others skilled in the art to which the above invention appertains to make and use the same, reference being had to the accompanying drawings, forming part of this specification.

My invention consists primarily in the extension of the flange for the support of the mold-board in such a shape as to form a broad rounded neck or breast, serving as a shield or guard to prevent the earth from falling over the mold-board at this point, and to prevent the weeds and trash from lapping around the neck or throat out of reach of the furrow-slice.

It further consists in a novel construction of the landside of the plow, to adapt it, as employed in breaking, to throw the weeds and trash outward therefrom, so that they may more readily be carried around the rounded throat by the furrow-slice; and also, as employed in cultivating, to press the earth up to the plants; also, in several novel constructions of mold-board adapted for employment for the different purposes for which they are intended in connection with the other parts of the plow; also, in novel modes of applying and securing the mold-board and fastening the slide or landside bar; in a novel mode of fastening the handles, and in the provision of a movable extension-plate to adapt the plow to work at more than ordinary depth.

Figure 1:
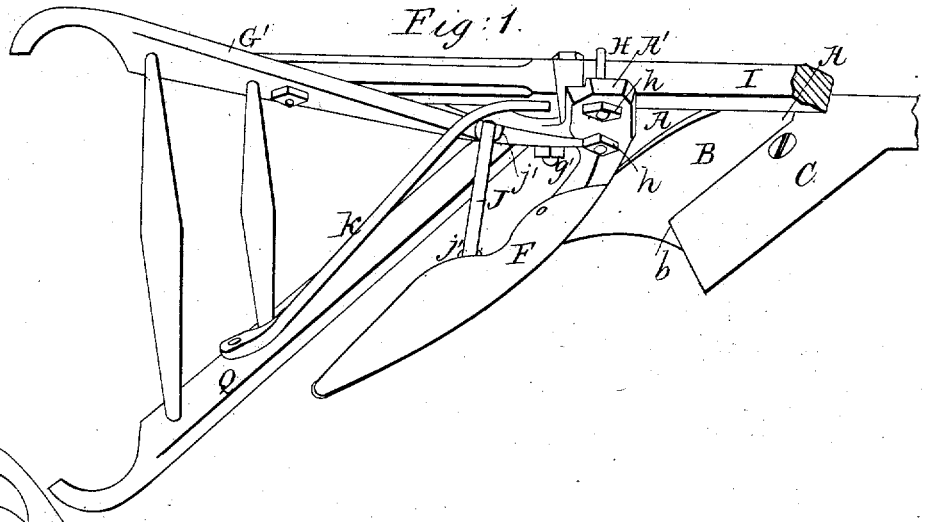
Figure 2:
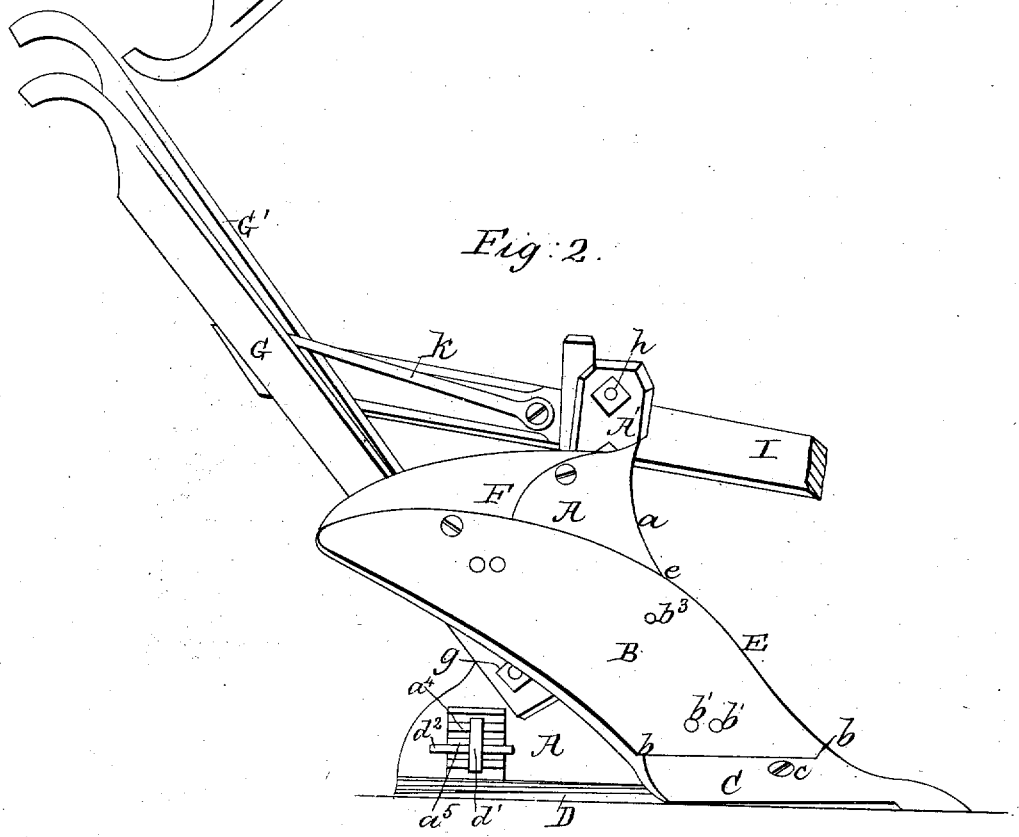
Figure 3:
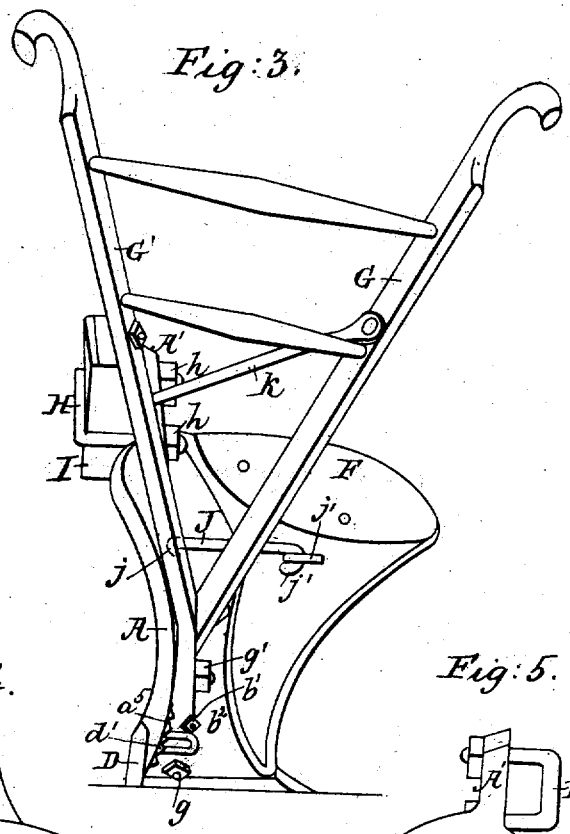
Figure 4:
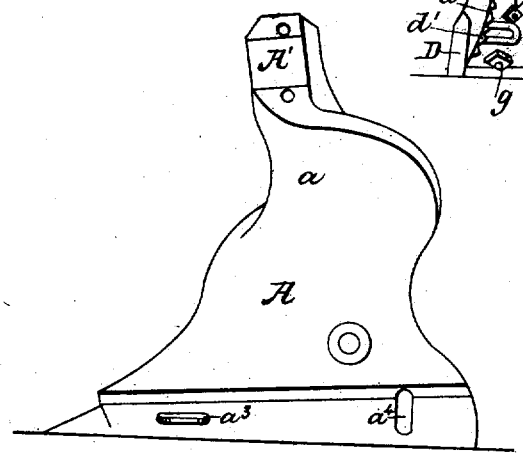
Figure 5:
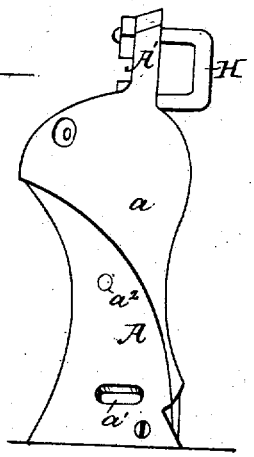
Figure 6:
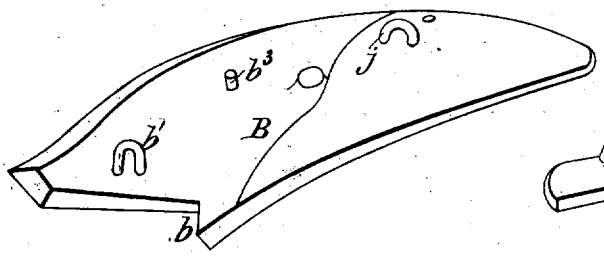
Figure 7:
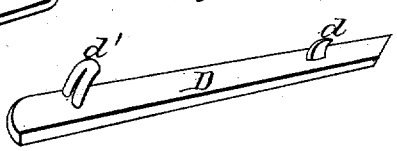
Figure 9:
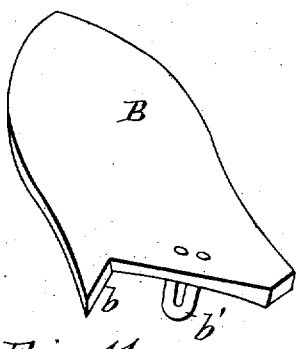
Figure 8:
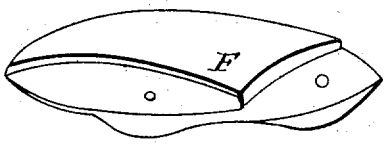
Figure 10:
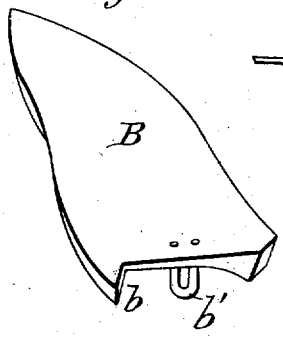
Figure 11:
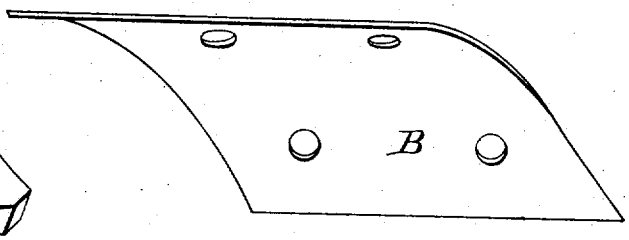

Figure 1 is a plan of a plow illustrating my invention. Fig. 2 is an elevation of the mold-board side of the plow. Fig. 3 is a rear end elevation of the plow. Fig. 4 is a side elevation of the frame or casting, hereinafter described. Fig. 5 is a front view of the same. Fig. 6 is a perspective view of the mold-board, showing the fastening devices on the inner side thereof. Fig. 7 is a perspective view of the slide or landside bar. Fig. 8 is a perspective view of the removable extension-piece, hereinafter referred to. Figs. 9, 10, and 11 are perspective views of different forms of mold-boards applicable to this plow.

Similar letters of reference indicate corresponding parts in the several figures.

In the drawings, A represents the frame or casting, to which are secured the mold-board B, shank or point C, and landside bar or slide D. The external exposed surface of said frame A forms the landside proper, as shown in Fig. 3. The opposite outer surface of said frame forms a bed, upon which the mold-board is fitted and secured, as shown in Fig. 2, the form of this surface adapting it to receive the different forms of mold-boards shown, or any other desired form as regards external surface, with equal facility.

On the top of the frame A is formed the standard or projection A′, to which the beam I is secured by means of the cuff or staple H and nuts *h*. The front edge, E, of the mold-board is extended and sharpened, so that, projecting in front of the frame, it forms the colter or cutter.

At *e*, Fig. 2, the cutter may be said to terminate, inasmuch as at that point the edges of the mold-board B and frame A become coincident, and thence they run back in parallelism, the one directly against and above the other, as far as the rear terminus of that side of frame A. By this construction the iron front of the plow is made to present a continuous curved surface above the cutter, said surface flaring outward in conformity or agreement with the mold-board. The upper part of the frame A, being thus made to unite with the mold-board to form a continuous deflecting surface on the one side, has the two sides of its upper portion joined by a short curve in front, and thus so much of the said frame A as extends above the point *e* serves to form a round neck or breast, *a*. This breast not only prevents the earth from falling backward over the top of the mold-board, but it prevents trash, weeds, &c., from clinging to the plow between the top *e* of the cutter and the beam I. The landside of frame A has a curvature, giving it an inward inclination from the bottom to near its mid-height; thence the landside has an outward inclination, which increases toward the rear.

It will be seen from the context and by reference to Fig. 8 that while the landside of the breast *a* has a comparatively-slight departure from parallelism with the line of draft the opposite or mold-board side of said breast stands at a considerable angle to said line. Hence in operation the vegetation and trash which are caught upon the breast *a* are drawn or forced from the landside by the mold-board side of said breast and cast off at the mold-board side of the plow, so as to be covered by the turned earth. Thus my improvement effectually prevents the choking, which constitutes a serious impediment in working other plows. The outward inclination of the landside of the breast *a* gives it a tendency to throw the earth toward the growing plants on that side, and therefore, when used for cultivating, the plow subserves the purpose of a hoe. When the plow is used for breaking, said inclination serves to throw aside the weeds and trash, and thus adapt them to be more readily drawn around the breast by the furrow-slice. The obliquity or inward inclination from the bottom of the landside gives the plow a firm hold upon the ground, preventing it from jumping or rising out of its proper working position, and moles up the earth on the side.

The share or point C is attached by one or more bolts, as at *c*, to the forward end of the mold-board side of the frame A. Shoulders *b* on the mold-board may be employed to brace the share in the direction of its resistance.

J, Figs. 1 and 3, is a brace-rod, the ends of which are bent so as to form two reflexed hooks, *j j*, which respectively engage with staples *j' j'*, on the inside of the mold-board and landside.

*b'* is a staple fixed rigidly to the forward end of the mold-board B, and passed through a slot, *a'*, in the forward end of frame, A, wherein said staple is held by a key, $b^2$, Fig. 3.

To secure the mold-board upon its bed on the frame A, the brace-rod J is first hooked to the staples *j' j'*, and then the staple *b'* is passed through the slot *a'* and keyed. The brace-rod J and staple *b'*, in conjunction with a stud, $b^3$, projecting from the mold-board into a corresponding hole, $a^2$, in the mold-board side of frame A, serve to very firmly and securely connect the mold-board and frame together. The reflexed form of the hooks *j j* of the brace-rod J renders their disengagement from the staples *j' j'* impossible when the mold-board is secured in position. This brace-rod is distinguishable from the common brace-rod from the fact that while one end of the latter is hooked or bent into a curve the other end is bent at a right angle, and thus endangers its detachment.

The forward end of the slide or landside bar D is held by the insertion of its hook-shaped projection *d* into the slot $a^3$ of the frame A. The rear end of said slide or bar D is provided with a staple, *d'*, which is passed into the vertical slot $a^4$ in the frame A, and held therein by a horizontal key, $d^2$, which is adjustable in the notches $a^5$ on the inner surface of the landside. When the base of the slide D has worn away the slide may be lowered, the key $d^2$ and notches $a^5$ enabling the staple *d'* to be held in any position to which it may be desired to adjust it in the slot $a^4$. On account of the position of the staple *d'* on the slide D, the bearings of the former are not subject to injurious friction with the earth. It should also be stated that the bottom of the frame A is protected from such friction by the projection of the share and slide below its lower edges.

The above-described devices for fastening the slide D are cheap, simple, and durable.

Of the plow-handles the beam-handle G' is fastened to the landside by a bolt, *g*, and just above this bolt the handles are fastened together by a bolt, *g'*. The handles are braced by a rod, K, extending from the beam. By constructing and fastening the handles in this manner like the beam, they are more easily adjusted and detached, better adapted to the different-sized plows, and also, in addition to these two advantages, we have another, the doing away with the necessity of bending or shaping the mold-board handle to fit the form of the mold-board, that handle in this instance being straight.

The frame A is especially suited for use in connection with the various kinds of mold-boards commonly employed, whether made of cast or wrought iron, steel, or wood, for breaking, fallowing, trenching, ditching, or cultivating, and it also admits of the application of steel scrapers or skinners for cotton and other crops. Hence the above-described method of attaching the handles is peculiarly adapted to admit of the extensive transformation above alluded to. The frame A adds greatly to the strength of the plow without making it inconveniently weighty.

The removable extension-piece F, Fig. 8, of wood or metal, bolted to the upper edge of the mold-board B, and frame A, adapts the plow to turn or furrow with equal effect while working to a greater depth than usual, so that it may be changed from a two-horse to a three or four horse plow at will. The mold-board shown in Fig. 10, when applied to the frame A, presents a much wider base than top.

In operation this mold-board burrows up the earth and allows about two-thirds of the earth to fall back in the furrow, while the remainder, rising along the line of the cutting-edge, is scattered over the surface beyond the furrow and smothers up the grass, &c. In the second operation this form of plow gives the crop a small quantity of earth, entirely covering the grass which grows around and between the plants. This form is also a subsoil-plow of the first magnitude, and this plow, with this form of mold-board, does the work of both plow and and hoe in the cultivation of crops when young.

The mold-board represented in Fig. 11 is employed as a scraper or skimmer for cotton and similar crops, and is made of steel in the usual manner. The share is removed for its attachment, which is made by bolts passing through the perforations at its front end and corresponding ones in the frame, it being so bent as to correspond with the mold-board-supporting flange of the frame. By the duplication of the holes through which its attaching-bolts pass, as shown, the similar formation of both of its ends and its attachment, as described, it is adapted to be reversed when one edge becomes worn. The plow provided with these different forms of mold-boards is an article of manufacture and merchandise, they being severally used with it for different purposes, as stated.

Having thus described my invention, the following is what I claim as new herein and desire to secure by Letters Patent:

1. A plow-frame or casting, A, having a neck or breast, *a*, constructed substantially as herein described, and serving to prevent the accumulation of trash, &c., between the cutting-edge and the beam.

2. A plow having its landside constructed as herein represented and described, for the purposes set forth.

3. The brace-rod J, reflexed at both ends, as described, and employed, in conjunction with the staples $j'$ $b'$ and key $b^2$, to connect the frame A and mold-board B, substantially as set forth.

4. The combination, with the slide or landside bar D, of the hook-shaped projection *d*, staple $d'$, key $d^2$, and notches $a^5$, for adjustably securing said slide to the frame A, as set forth.

5. The handles G G′, both attached to the landside side of the plow, as represented and described, for the purposes set forth.

6. The removable extension-piece F, applied substantially as and for the purpose set forth.

7. The mold-board B, Fig. 10, formed wide at bottom and narrow at top, substantially as represented and described, for the purposes set forth.

8. The mold-board B, Fig. 11, adapted for support on the frame A and to be removed and reversed, as represented and described.

GEO. WATT.

Witnesses:

R. A. WILLIAMS,
E. G. KNIGHT.